United States Patent

[11] 3,610,453

| [72] | Inventor | Cecil Goodacre<br>Basingstoke, England |
|---|---|---|
| [21] | Appl. No. | 799,362 |
| [22] | Filed | Feb. 14, 1969 |
| [45] | Patented | Oct. 5, 1971 |
| [73] | Assignee | Lansing Bagnall Limited<br>Basingstoke, Hampshire, England |
| [32] | Priority | Feb. 16, 1968 |
| [33] | | Great Britain |
| [31] | | 7789/68 |

[54] INDUSTRIAL TRUCKS
7 Claims, 4 Drawing Figs.

[52] U.S. Cl. .................................................. 214/670,
180/85, 280/104, 280/111
[51] Int. Cl. ....................................................... B66f 9/08,
B66f 9/12
[50] Field of Search ........................................... 280/104,
111; 180/85; 214/660, 670–672

[56] References Cited
UNITED STATES PATENTS
3,273,665  9/1966  Goodacre .................... 180/85
FOREIGN PATENTS
820,781  9/1959  Great Britain ................ 214/670

Primary Examiner—Gerald M. Forlenza
Assistant Examiner—Robert J. Spar
Attorney—E. T. Le Gates ABSTRACT: An industrial load-handling truck having a body portion supported on ground wheels with a pair of straddle legs projecting from said body portion, said straddle legs being pivotally attached to the body portion, for up-and-down pivotal movement about a horizontal transverse axis and being provided with ground wheels at positions remote from the pivotal attachments and with means interconnecting the legs in a manner such that upward pivotal movement of one leg will be accompanied by downward pivotal movement of the other leg.

PATENTED OCT 5 1971

PATENTED OCT 5 1971

INDUSTRIAL TRUCKS

This invention relates to industrial trucks and provides an industrial load-handling truck having a body portion supported on ground wheels with a pair of straddle legs projecting from said body portion, said straddle legs being pivotally attached to the body portion for up-and-down pivotal movement about a horizontal transverse axis and being provided with ground wheels at positions remote from the pivotal attachments and with means interconnecting the legs in a manner such that upward pivotal movement of one leg will be accompanied by downward pivotal movement of the other leg.

It is preferred that the pivotal axis aforesaid is between the wheels on the straddle legs and those supporting the body. Preferably both straddle legs are pivoted about the same horizontal axis. In the case of the truck being a reach truck having a mast or other load-carrying element mounted to move longitudinally of the truck along guides centrally on the body portion and further guides on the straddle legs, the mast being provided with rollers for engagement in the guides on the straddle legs it is preferred that the mast is movable along guides to and from a position in which the axes of the rollers are vertically aligned with the axes of the straddle leg pivots. Such an arrangement reduces pivoting of the reach carriage and hence the mast, during pivoting of the straddle legs.

The means for interconnecting the straddle legs preferably comprise a transverse link which is pivotally mounted at its center to the body portion of the truck about a horizontal axis extending longitudinally of the truck, the straddle legs being pivotally mounted to the truck on opposite sides of the center thereof.

The aforesaid ground wheels preferably comprise a front pair of wheels mounted on the ends of the straddle legs which are remote from the body portion of the truck and a rear pair of steerable wheels mounted beneath and supporting the body portion of the truck, the said rear wheels each having electric drive means mounted in the hub of the wheel. Alternatively, one of the rear wheels may be a nondriven steerable wheel or a castor. The rear wheels may be held against up-and-down movement relative to the body portion.

A specific example of an industrial lift truck according to the invention will now be described with reference to the accompanying drawings in which.

Figure 1:
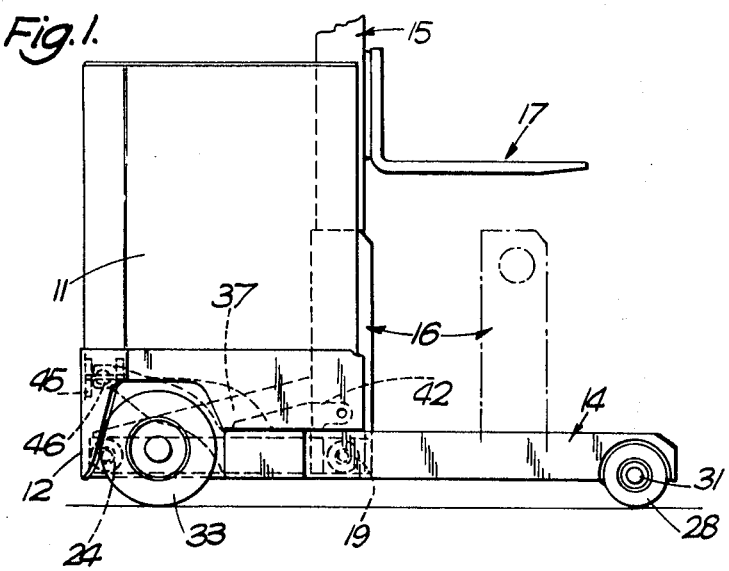
FIG. 1 is a side view of the truck with the mast in the retracted position.
Figure 2:
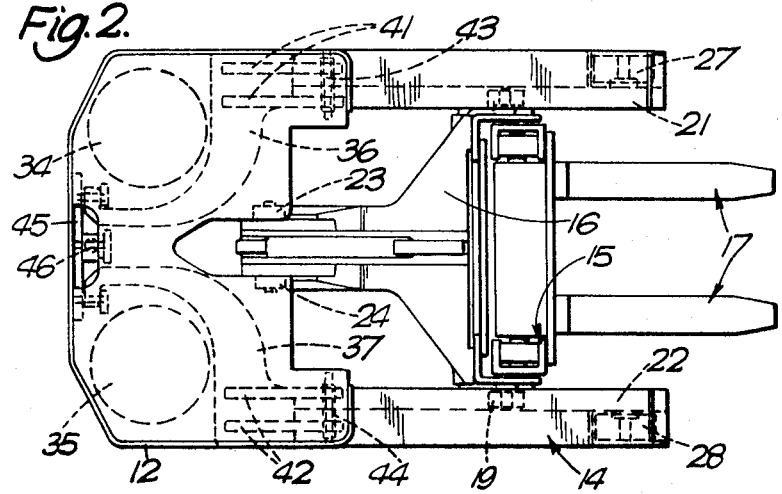
FIG. 2 is a plan view of the truck of FIG. 1, with the body portion removed and the mast partially extended.
Figure 3:
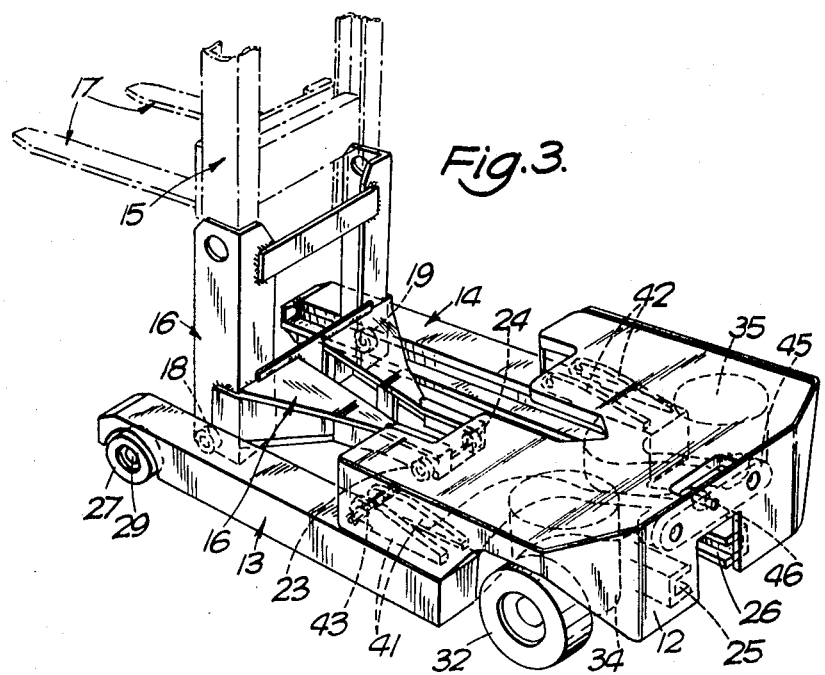
FIG. 3 is a rear perspective view of the truck as shown in FIG. 2.

The subject of this example is an industrial lift truck comprising a body portion 11 built on a chassis 12 and having two straddle legs 13, 14 extending forwardly from the chassis. A mast structure 15 is mounted in front of the body portion 11 on a reach carriage 16, and has a load-lifting carriage 17 capable of up-and-down movement on the mast. The reach carriage 16 is provided with forward guide rollers 18, 19 which are widely spaced for sliding movement within inwardly facing channels 21, 22 provided by the straddle legs 13, 14 and rearward guide rollers 23, 24 which are closely spaced for sliding movement within further inwardly facing channels 25, 26 mounted on the chassis 12.

Ground wheels 27, 28 are provided one at the end of each straddle leg 13, 14 on stub axles 29, 31 and a pair of drive wheels 32, 33 are carried in steerable supports 34, 35 which are rigidly mounted beneath the chassis 12 of the truck, each drive wheel having electric drive means mounted in the hub of the wheel.

This invention is concerned with the construction of the straddle legs and associated parts and with the manner in which the straddle legs 13, 14 are mounted on the body portion of the truck and therefore the further description will be limited thereto.

The straddle legs 13, 14 are mirror images of one another and comprise channel sections 21 and 22, to accommodate the rollers 18 or 19, and rearwardly extending lever sections 36, or 37, which are shaped to pass around the drive wheel supports 34, 35 and terminate in bosses 38 and 39 at their ends. At the rear ends of the channel sections 21, 22 are provided two parallel upstanding brackets 41, 42 providing bearings for spindles 43, 44 which are pivotally connected to the chassis 12 of the truck. The spindles 43, 44 extend transversely of the truck and allow the legs 13, 14 to pivot in a vertical plane.

The bosses 38, 39 at the ends of levers 36, 37 are pivotally attached to the opposite ends of a horizontal link 45 which, at its center, is pivotally mounted by a ball joint 46 to the chassis 12 of the truck above the channels 25 and 26, whereby upward movement of the end of the leg 13 and the wheel 27 will effect an equal downward movement of the end of the leg 14 and the wheel 28, and vice versa. Both the ground wheels 27, 28 of the legs 13, 14 will thereby rest firmly on the ground during movement of the truck over uneven ground.

The pivotal movement of the horizontal link 45 may be restrained by resilient devices, such as rubber buffers, if desired, so that the movement of the legs 13, 14 is not entirely free and the stabilizing effect is more solid than if such devices are not used.

The transverse axes of the spindles 43, 44 about which the legs pivot are aligned with each other and are also located above the forward guide rollers 18, 19 of the reach carriage 16 for the mast 15, when the reach carriage is in its rearmost position. Such an arrangement ensures minimum pivoting of the reach carriage, and thus the mast, during pivoting of the straddle legs. However, any pivoting of the reach carriage 16 that may occur may be accommodated by mounting the rearward guide rollers 23, 24 onto the reach carriage by means of a pivot having its axis extending longitudinally of the truck.

The invention is not restricted to the specific details of the embodiment described above. For example, the truck may not be a reach truck. In this case, the inwardly facing channels 21, 22 of the straddle legs 13, 14 would be omitted. Also, one of the ground wheels 32, 33 beneath the body of the truck may be a nondriven steerable wheel or a castor.

Figure 4:
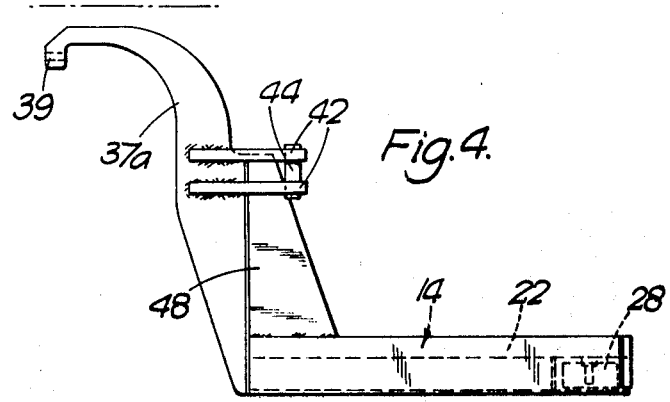
FIG. 4 is a plan view of a modified right-hand straddle leg for the truck.

In FIG. 4 is shown a modified right-hand straddle leg 14 in which the channel section 22 is positioned outside the width of the truck by the use of a modified lever 37a and strengthening element 48. A mirror-image modified leg is used on the other side of the truck in conjunction with the leg shown. By means of such a construction employing levers and strengthening elements of different dimensions it is possible to provide a range of trucks of different widths but all utilizing the same chassis 12, body 11, channel sections 21, 22 and drive means 32, 33, 34, 35. Lateral extensions are provided on the reach carriage to carry the rollers 18, 19 so that they engage the channels 21, 22 in the modified legs.

I claim:

1. An industrial load-handling truck having a body portion supported on ground wheels with a pair of straddle legs projecting from said body portion, said straddle legs being pivotally attached to the body portion for up-and-down pivotal movement about a horizontal transverse axis and being provided with ground wheels at positions remote from the pivotal attachments the straddle legs being interconnected by a transverse link which is pivotally mounted at its center to the body portion of the truck about a horizontal axis extending longitudinally of the truck, the straddle legs being pivotally mounted to the truck on opposite sides of the center thereof, so that upward pivotal movement of one leg will be accomplished by downward pivotal movement of the other leg.

2. A truck as claimed in claim 1 in which the pivotal axis aforesaid is between the wheels on the straddle legs and the wheels supporting the body.

3. A truck as claimed in claim 1 in which both straddle legs are pivoted about the same horizontal axis.

4. A truck as claimed in claim 3 and having a mast or other load-carrying element mounted to move longitudinally of the truck along guides centrally on the body portion and further guides on the straddle legs, the mast being provided with rollers for engagement in the guides on the straddle legs and movable therealong to and from a position in which the axes of the rollers are vertically aligned with the axes of the straddle leg pivots.

5. A truck as claimed in claim 1 wherein the said ground wheels comprise a front pair of wheels mounted on the ends of the straddle legs which are remote from the body portion of the truck and a rear pair of steerable wheels mounted beneath and supporting the body portion of the truck.

6. A truck as claimed in claim 5 wherein each of said rear wheels has electric drive means mounted in the hub of the wheel.

7. A truck as claimed in claim 5 wherein the said rear wheels are held against up-and-down movement relative to the body portion of the truck.